(12) United States Patent
Okabe et al.

(10) Patent No.: US 9,371,946 B2
(45) Date of Patent: Jun. 21, 2016

(54) PIPE JOINT

(71) Applicants: TOKYO ELECTRON LIMITED, Minato-ku (JP); FUJIKIN INCORPORATED, Osaka-shi (JP)

(72) Inventors: Tsuneyuki Okabe, Minato-ku (JP); Shuji Moriya, Minato-ku (JP); Kenichi Sato, Minato-ku (JP); Tomohiro Nakata, Osaka (JP); Tsutomu Shinohara, Osaka (JP); Michio Yamaji, Osaka (JP)

(73) Assignees: Tokyo Electron Limited, Minato-ku (JP); Fujikin Incorporated, Osaka-shi (JP)

( * ) Notice: Subject to any disclaimer, the term of this patent is extended or adjusted under 35 U.S.C. 154(b) by 49 days.

(21) Appl. No.: 14/057,449

(22) Filed: Oct. 18, 2013

(65) Prior Publication Data

US 2014/0110937 A1    Apr. 24, 2014

(30) Foreign Application Priority Data

Oct. 19, 2012 (JP) ................................. 2012-231615

(51) Int. Cl.
*F16L 19/00* (2006.01)
*F16L 19/02* (2006.01)
*F16L 19/025* (2006.01)
*F16L 23/20* (2006.01)

(52) U.S. Cl.
CPC ............ *F16L 19/0218* (2013.01); *F16L 19/025* (2013.01); *F16L 23/20* (2013.01)

(58) Field of Classification Search
CPC ...... F16L 19/02; F16L 19/025; F16L 19/0218
See application file for complete search history.

(56) References Cited

U.S. PATENT DOCUMENTS

| 1,930,833 | A | * | 10/1933 | Barrett | 285/281 |
| 3,840,257 | A | * | 10/1974 | Moore | 285/334.3 |
| 5,040,714 | A | * | 8/1991 | McManigal | 285/363 |
| 5,060,987 | A | * | 10/1991 | Miller | 285/328 |
| 5,066,051 | A | * | 11/1991 | Weigl et al. | 285/328 |
| 5,131,692 | A | * | 7/1992 | Lemons | 285/334.2 |
| 5,145,219 | A | * | 9/1992 | Babuder | 285/330 |
| 5,163,721 | A | * | 11/1992 | Babuder | 285/328 |
| 5,306,052 | A | * | 4/1994 | McGushion | 285/328 |
| 5,829,796 | A | * | 11/1998 | Robinson | 285/288.1 |
| 6,416,087 | B1 | * | 7/2002 | Kremer | 285/328 |
| 6,547,255 | B1 | * | 4/2003 | Donaway et al. | 277/602 |
| 6,685,237 | B1 | * | 2/2004 | Robinson | 285/330 |

(Continued)

FOREIGN PATENT DOCUMENTS

| CA | 2479680 A1 | * | 9/2003 |
| JP | 7-54165 A | | 2/1995 |

(Continued)

*Primary Examiner* — David E Bochna
*Assistant Examiner* — James Linford
(74) *Attorney, Agent, or Firm* — Oblon, McClelland, Maier & Neustadt, L.L.P

(57) ABSTRACT

A pipe joint includes first and second joint members having fluid channels communicating with each other, an annular gasket to be interposed between abutting end surfaces of the both joint members, and a nut configured to couple the joint members. The nut is provided with an inner surface treated layer. The inner surface treated layer includes a Co (cobalt)-P (phosphorous) alloy metal coating provided on an inner surface of the nut and a fluorine coating provided on the surface of the alloy metal coating.

2 Claims, 6 Drawing Sheets

(56) References Cited

U.S. PATENT DOCUMENTS

| | | | | |
|---|---|---|---|---|
| 2001/0038206 A1* | 11/2001 | Olechnowicz et al. | | 285/328 |
| 2009/0033087 A1* | 2/2009 | Carcagno et al. | | 285/55 |
| 2010/0095794 A1 | 4/2010 | Matsushita | | |
| 2010/0096850 A1* | 4/2010 | Schuh et al. | | 285/333 |
| 2010/0193717 A1 | 8/2010 | Tanikawa et al. | | |
| 2010/0304179 A1* | 12/2010 | Facchini et al. | | 428/615 |
| 2012/0141216 A1* | 6/2012 | Zitzlaff | | 407/107 |

FOREIGN PATENT DOCUMENTS

| | | | |
|---|---|---|---|
| JP | 8-338574 A | | 12/1996 |
| JP | 11-280967 A | | 10/1999 |
| JP | 2003-74766 A | | 3/2003 |
| JP | 2003-322127 A | | 11/2003 |
| JP | 2007-46678 A | | 2/2007 |
| JP | 2010-96329 A | | 4/2010 |
| JP | 2010096329 A | * | 4/2010 |
| WO | WO 2008/120788 A1 | | 10/2008 |

* cited by examiner (a)

(b)

PIPE JOINT

BACKGROUND OF THE INVENTION

1. Technical Field

The present invention relates to a pipe joint.

2. Description of the Related Art

Known examples of the pipe joint of the related art include first and second joint members having fluid channels communicating with each other, an annular gasket to be interposed between abutting end surfaces of the both joint members (one member which constitutes a sealing device), and a nut configured to couple the joint members (for example, JP-A-2003-74766).

As a technology to prevent seize and galling when tightening a nut, applying silver plating on an inner surface of the nut is known (JP-A-07-54165).

With a pipe joint using a nut on which the silver plate is applied on the inner surface described above, there is a risk of entry of fine particles generated by being rubbed off by repeated mounting and demounting into a piping.

SUMMARY

It is an object of the invention to provide a pipe joint which is not changed significantly in tightening torque from that in the related art even though being repeatedly mounted and demounted and hence does not generate fine particles.

A pipe joint including: first and second joint members having fluid channels communicating with each other; a sealing device configured to seal an abutting portion between the both joint members; and a nut configured to couple the joint members with respect to each other, wherein the nut is formed with a Co—P alloy metal coating on an inner surface thereof.

The nut provided with the Co—P alloy metal coating is superior in that a tightening torque required when the magnitude of the tightening torque with respect to a tightening angle is equivalent and the number of mounting and demounting operations is increased is equivalent to that of the silver-plated nut, and in addition, in being resistant to seize and generating no fine particle. Therefore, according to the pipe joint of the invention, no fine particle is generated and hence a problem of entry of the fine particles into a piping is solved.

The material of the nut body is an adequate stainless steel (for example, SUS316).

The Co—P alloy metal coating may be formed by, for example, electroless plating and, instead, may be formed by vacuum film formation by using Vacuum Deposition method or Spattering Method. The thickness of the Co—P alloy metal coating ranges from 0.1 μm to 10 μm. The content of P (phosphorous) is, for example, 3% to 10%, and preferably 6%. The Co—P alloy metal coating having a Vickers hardness of 500 or higher (550, for example), which is several times the Vickers hardness of the silver plate, which is approximately 80, and hence is advantageous in abrasion resistance.

Preferably, a fluorine coating is applied on the surface of the alloy metal coating. The fluorine coating may be a coating of polymers containing fluorine, or may be a non-polymerized coating of fluoro-group-containing compound. The fluorine coating is preferably a copolymer coating. The fluorine copolymer coating is formed of a fluorine copolymer containing, for example, vinylidene fluoride, tetrafluoroethylene, reactive silicone oil, hydroxyl group containing vinyl ether, and unsaturated carboxylic acid. As detailed examples of the fluorine resin include, polytetrafluoroethylene (PTFE), FEP, PFA and ETFE. The thickness of the fluorine resin coating ranges, for example, from 10 nm to 1 μm, and preferably, from 10 nm to 100 nm.

A screw device configured to couple the joint members to each other may have various configurations. For example, a configuration in which a male screw portion is formed on one of the first and second joint members and the both joint members are coupled by a nut screwed onto the male screw portion of the joint member is also applicable. Alternatively, a configuration in which both of the first and second joint members are sleeves without the male screw portions formed thereon, and the both joint members are coupled with a separate male screw member and a nut is also applicable.

Preferably, the sealing device includes a gasket and a retainer configured to hold the gasket and fitted to retainer storage depressions provided respectively on abutting end surfaces of the both joint members, inner peripheral surfaces of the retainer storage depressions of the respective joint members include large-diameter inner periphery portions on the side of the abutting end surfaces and small-diameter inner periphery portions on axially opposite sides thereof, the retainer includes a cylindrical retainer body having an outer diameter substantially equal to the diameters of the small-diameter inner periphery portions of the retainer storage depressions, an annular projecting portion formed integrally with the retainer body, and an annular groove opening to an outer peripheral surface of the annular projecting portion, and a resilient ring configured to cause the joint member to hold the retainer is fitted to the annular groove of the retainer.

In this configuration, entry of the fine particles from the outside is prevented by fitting of the small-diameter inner periphery portion of the retainer storage depressions and the retainer body. Therefore, by the combination of the pipe joint using the above-described nut, entry of the fine particles from the outside into the fluid channel is further prevented, and the higher cleanliness may be maintained.

According to the pipe joint of the invention, since the Co—P alloy metal coating is provided on the inner surface of the nut, no fine particle is generated and hence a problem of entry of the fine particles into the piping is solved.

DESCRIPTION OF THE PREFERRED EMBODIMENTS

Figure 1:
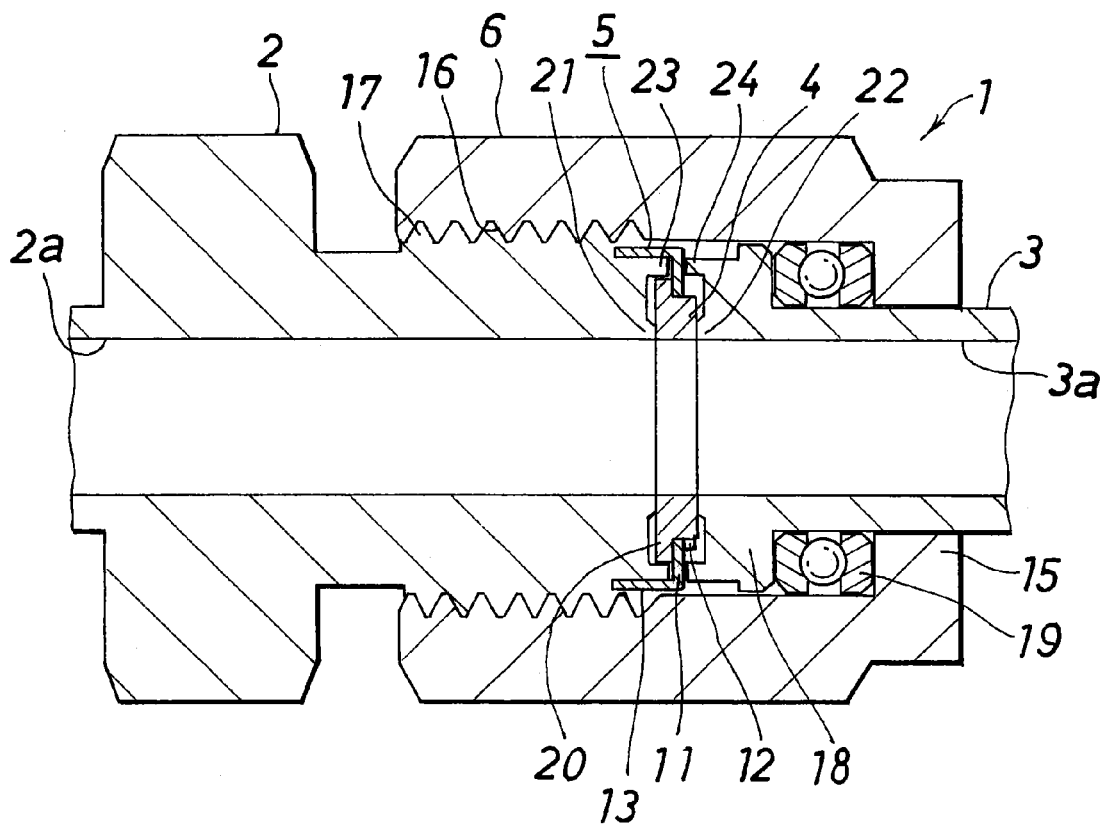
FIG. 1 is a vertical cross-sectional view illustrating a first embodiment of a pipe joint according to the invention.

Embodiments of the invention will be described with reference to the drawings below. In the following description, terms "up" and "down" correspond to "up" and "down" in the drawings.

Figure 2:
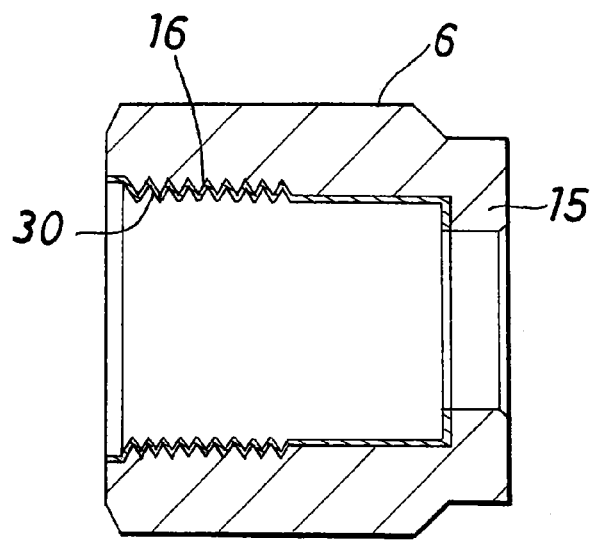
FIG. 2 is a vertical cross-sectional view illustrating details of a nut illustrated in FIG. 1.
Figure 3:
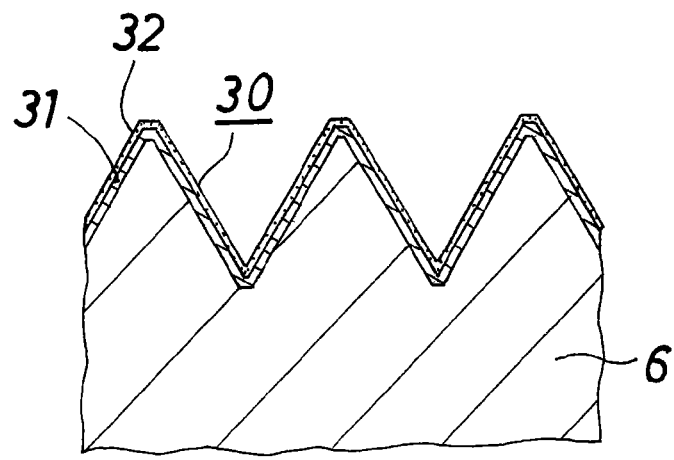
FIG. 3 is an enlarged cross-sectional view of part of the nut.

FIG. 1 to FIG. 3 illustrate a first embodiment of a pipe joint according to the invention.

A pipe joint (1) includes a first tubular joint member (2) and a second tubular joint member (3) having fluid channels (2a), (3a) communicating with each other, an annular gasket (4) interposed between a right end surface of the first tubular joint member (2) and a left end surface of the second tubular joint member (3), and a retainer (5) configured to hold the annular gasket (4) and to be held by the first tubular joint member (2), and the second tubular joint member (3) is fixed to the first tubular joint member (2) by a nut (6) screwed from the second tubular joint member (3) side onto the first tubular joint member (2).

The retainer (5) is integrally formed of a stainless steel plate, and includes an annular portion (11), a gasket holding portion (12) formed of three claws provided on a right end of the annular portion (11) so as to project inward and configured to hold an outer peripheral surface of the gasket (4), and a joint member holding portion (13) configured to engage the right end surface of the first tubular joint member (2).

The nut (6) is formed of SUS316. As illustrated in FIG. 2 and FIG. 3, the nut (6) is provided with an inner surface treated layer (30), and the inner surface treated layer (30) includes a Co (cobalt)-P (phosphorus) alloy metal coating (31) provided on an inner surface of the nut (6), and a fluorine coating (32) provided on the surface of the alloy metal coating (31).

The thickness of the Co—P alloy metal coating (31) is 5 μm and the thickness of the fluorine coating (32) is 50 nm.

The content of P (phosphorus) in the Co—P alloy metal coating (31) is approximately 10%. The Co—P alloy metal coating (31) has a Vickers hardness Hv of 550, a Rockwell hardness HRC of 52.3, a coefficient of static friction of 0.254, and a coefficient of dynamic friction of 0.148.

The nut (6) is formed with a flange (15) extending inward on a right end portion thereof, and the portion of the flange (15) is fitted to the periphery of the second tubular joint member (3). A female screw (16) is formed on an inner periphery of a left end portion of the nut (6), and the female screw (16) is screwed onto a male screw (17) formed on the right side of the first tubular joint member (2). An outward flange (18) is formed on an outer periphery of the left end portion of the second tubular joint member (3), and a thrust ball bearing (19) for preventing co-rotation is interposed between the outward flange (18) and the inward flange (15) of the nut (6). A thrust washer may be employed instead of the thrust ball bearing (19).

The gasket (4) is formed of nickel alloy, and is silver plated as needed. Examples of the material of the gasket (4) to be employed as needed include austenite-based stainless steel, copper, or aluminum alloy. The gasket (4) is provided with a retaining portion (20) formed of an outward flange which engages the gasket holding portion (12) of the retainer (5) on an outer periphery of the left end portion of the gasket (4). Therefore, even when the gasket (4) is hardly pressed against the retainer (5), the gasket (4) does not drop from the right side of the retainer (5), and hence an operation to cause the retainer (5) to hold the gasket (4) or to cause the joint members (2), (3) to hold the retainer (5) is easily performed.

Gasket holding annular projections (21), (22) are formed on inner peripheral portions of abutting end surfaces of the joint members (2), (3) respectively, and overtightening preventing annular projections (23), (24) are formed on outer peripheral portions of the same, respectively. A sealing device is formed by the gasket (4), the retainer (5), the gasket holding annular projections (21), (22), and the overtightening preventing annular projections (23), (24).

The height of the gasket holding annular projections (21), (22) is slightly smaller than the amount of movements of the respective joint members (2), (3) in the axial direction (lateral direction) with respect to the gasket (4) when an adequate fastening is performed.

The respective overtightening preventing annular projections (23), (24) protrude further than the gasket holding annular projections (21), (22) so as to press the retainer (5) from both sides thereof when the adequate fastening is performed. The respective overtightening preventing annular projections (23), (24) protect the gasket holding annular projections (21), (22) of the respective joint members (2), (3) before assembly, whereby the gasket holding annular projections (21), (22) which significantly affect sealing properties are prevented from being damaged.

In the pipe joint (1) described above, only distal ends of the both gasket holding annular projections (21), (22) press the gasket (4) from both sides thereof in a state in which the nut (6) screwed onto the first tubular joint member (2) is tightened from the side of the second tubular joint member (3) by hand. From this state, when the nut (6) is rotated, for example, by ⅙ turn to tighten adequately, the gasket holding annular projection (21) of the first tubular joint member (2) and the gasket holding annular projection (22) of the second tubular joint member (3) press the gasket (4) hardly from the both sides thereof, so that depressions are formed on both sides of the gasket (4) and fluid-tight coupling is achieved. Simultaneously, portions of the end surfaces of the respective joint members (2), (3) where the gasket holding annular projections (21), (22) are not formed also press the gasket (4) from both sides thereof, and the gasket (4) is held by entire end surfaces of the both joint members (2), (3). Therefore, bending and twisting of the gasket (4) caused by the gasket (4) being pressed strongly only by the gasket holding annular projections (21), (22) are prevented.

Figure 6:
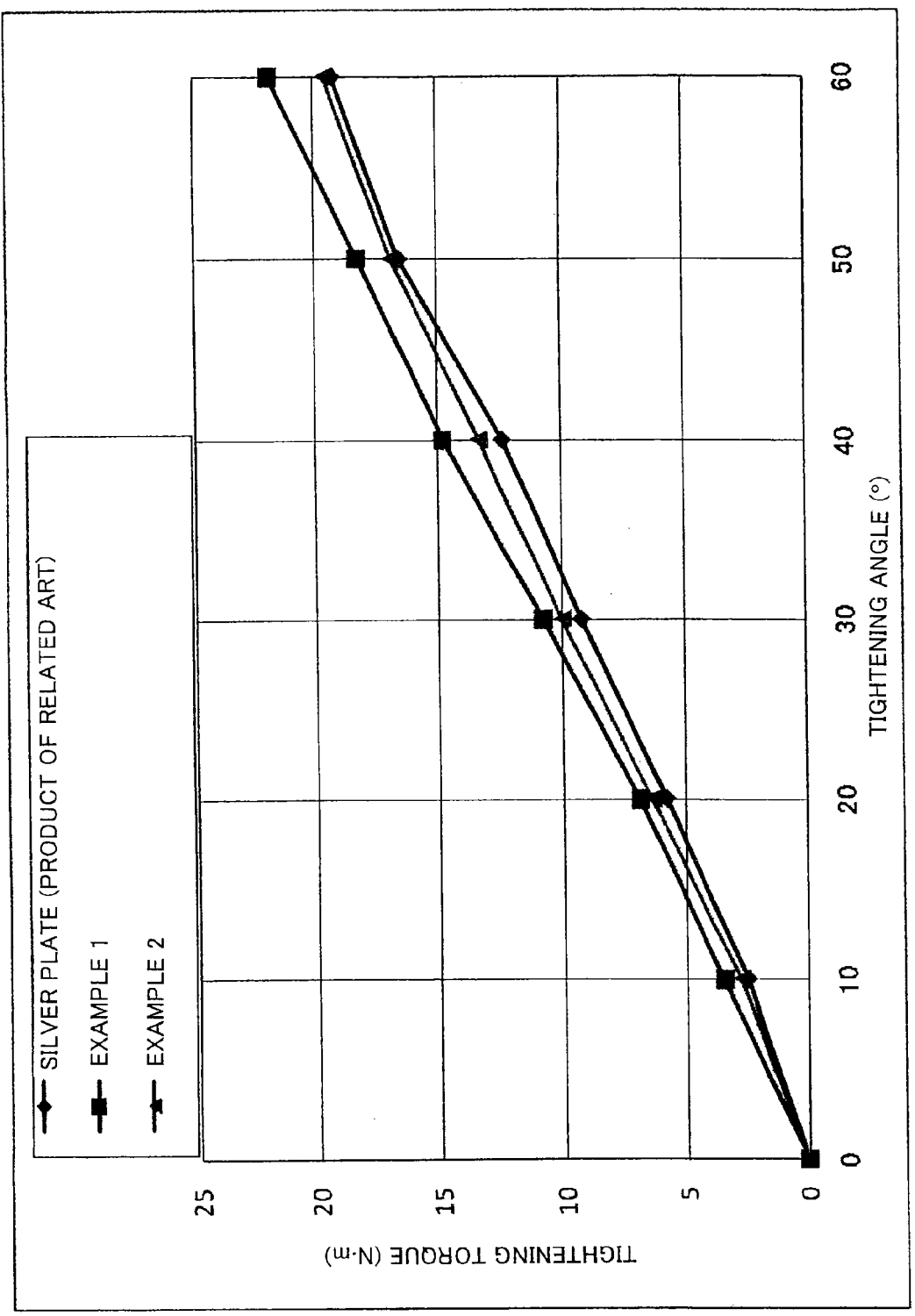
FIG. 6 is a graph illustrating a tightening performance of the embodiment of the pipe joint of the invention compared with that of the related art.
Figure 7:
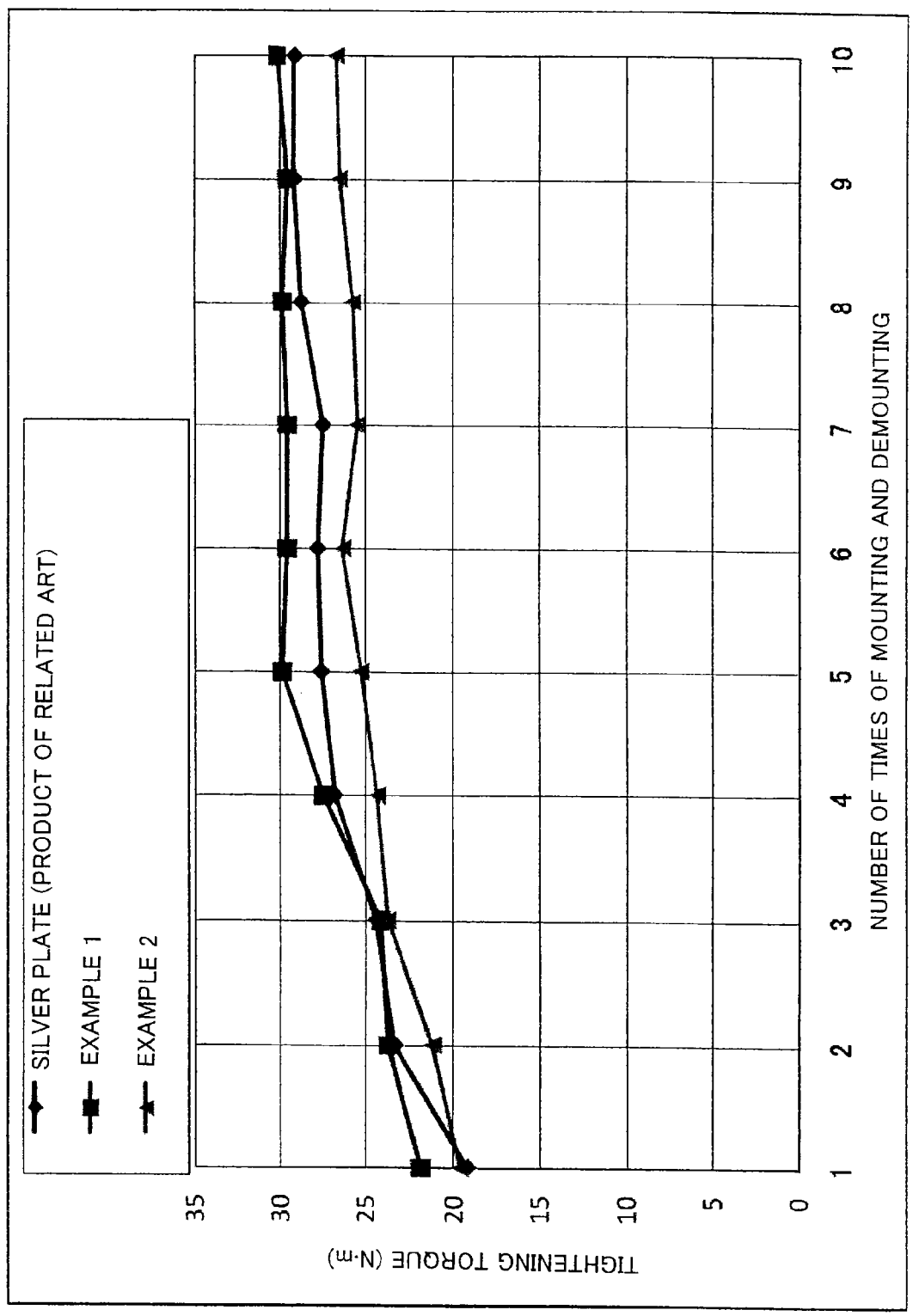
FIG. 7 is a graph illustrating a mounting and demounting performance of the embodiment of the pipe joint of the invention compared with that of the related art.

Comparisons of the nut (6) used on the above-described embodiment with a silver-plated nut of the related art are illustrated in FIG. 6 and FIG. 7. In FIG. 6 and FIG. 7, Example 1 shows the nut (6) provided only with the Co (cobalt)-P (phosphorus) alloy metal coating (31) on the inner surface thereof, and Example 2 shows the nut (6) provided further with the fluorine coating (32) on the surface of the alloy metal coating (31).

The magnitude of a tightening torque with respect to a tightening angle (FIG. 6) and the magnitude of a tightening torque required when the number of mounting and demounting is increased (FIG. 7) are set as evaluation items for comparison for securing the mounting and demounting performance. A larger tightening torque indicates a larger frictional resistance. When tightening the nut (6), since a higher tightening force (thrust force) is obtained from a lower friction, the lower the tightening torque, the more preferable. As regards the magnitude of the tightening torque when the number of mounting and demounting is increased, the smaller the amount of increase of the tightening torque with increase in number of mounting and demounting, the more preferable.

From FIG. 6 and FIG. 7, it is apparent that the substantially same performances as the silver-plated nut are obtained by employing the alloy metal coating (31) formed of Co—P. Furthermore, it is apparent that by applying the fluorine coating (32) on the alloy metal coating (31) formed of Co—P, performances further closer to the silver-plated nut are obtained.

Figure 8:
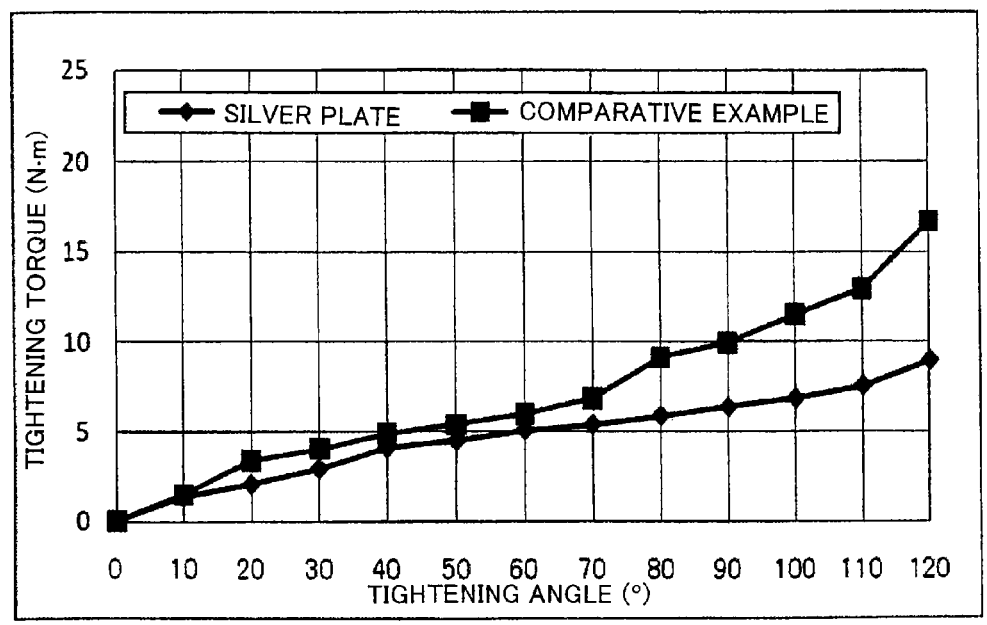
FIG. 8(a) is a graph illustrating a comparison of a tightening performance between a comparative example corresponding to the embodiment of the pipe joint of the invention and that of the related art.
FIG. 8(b) is a graph illustrating a comparison of a mounting and demounting performance between a comparative example corresponding to the embodiment of the pipe joint of the invention and that of the related art.
Figure 8:
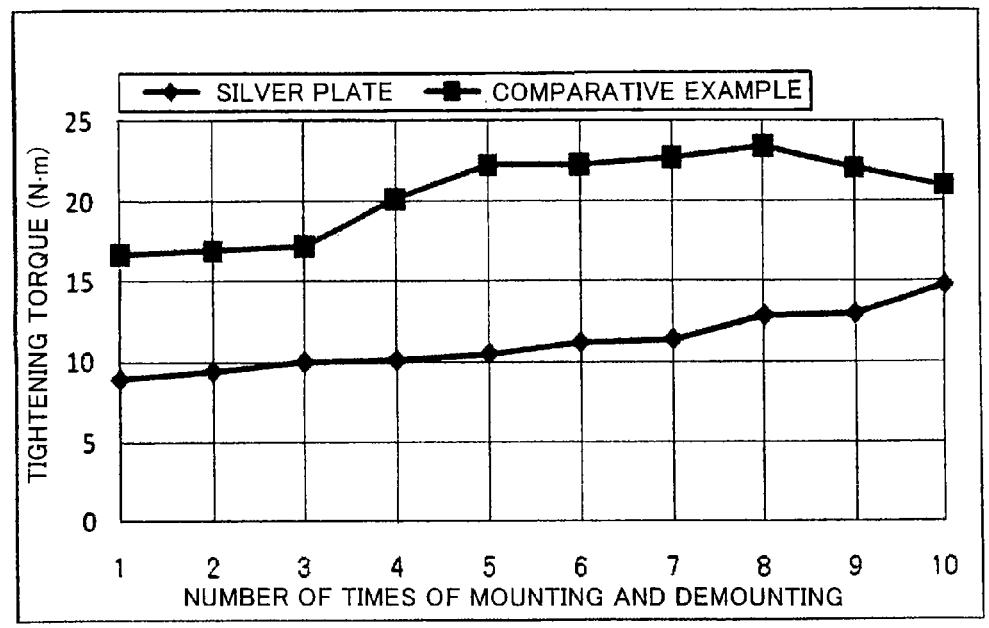

Nickel is known as a material which may be used instead of silver. However, in the comparative example in which nickel-P is used (Ni—P+fluorine coating), the nut equivalent to silver plate is not obtained as illustrated in FIG. 8.

The alloy metal coating (31) formed of Co—P is superior in comparison with the silver plate in having resistance to seize and generating no fine particle. By using the nut (6) provided with the Co—P alloy metal coating (31) on the inner surface thereof (preferably, provided with the fluorine coating (32) further on the surface of the alloy metal coating (31)), a problem of the silver plate (a problem of risk of entry of fine particles generated by the silver plate being rubbed off as a result of repeated mounting and demounting into the piping) may be solved while ensuring performances of the silver-plated nut superior as the pipe joint nut (having a low tightening torque and having a small increase in tightening torque when the mounting and demounting are repeated). When having the same film thickness as the silver plating, the alloy metal coating (31) formed of Co—P is superior in abrasion resistance.

Figure 4:
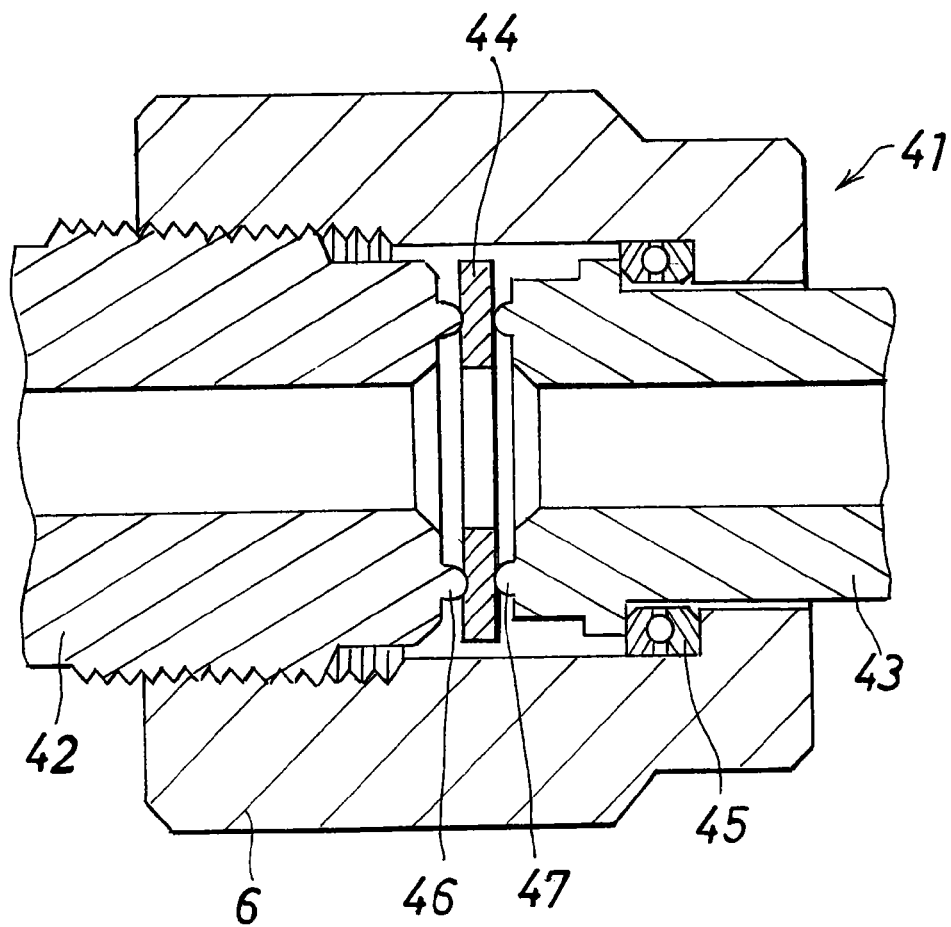
FIG. 4 is a vertical cross-sectional view illustrating a second embodiment of a pipe joint according to the invention.

The configuration of the pipe joint other than the nut is not specifically limited, and a pipe joint improved in mounting and demounting performance is obtained by replacing a nut with the above-described nut (6) in known various pipe joint. FIG. 4 illustrates a second embodiment of a pipe joint according to the invention.

A pipe joint (41) includes a first tubular joint member (42) and a second tubular joint member (43) having fluid channels (42a), (43a) communicating with each other, an annular gasket (44) interposed between a right end surface of the first tubular joint member (42), a left end surface of the second tubular joint member (43), and a thrust ball bearing (45) that prevents co-rotation, the second tubular joint member (43) is fixed to the first tubular joint member (42) by the nut (6) screwed from the second tubular joint member (43) side onto the first tubular joint member (42). The gasket (44) is square in cross section, and is formed with gasket holding annular projections (46), (47) at substantially center portions in the radial direction of abutting end surfaces of the respective joint members (42), (43) respectively. In the second embodiment, the sealing device is formed by the gasket (44) and the gasket holding annular projections (46), (47).

As regards a configuration of a pipe joint other than the nut or, for example, in a pipe joint in which a ferrule is used instead of the gaskets (4), (44) as the sealing device, a pipe joint improved in mounting and demounting performance is obtained by replacing the nut with the nut (6) described above.

Figure 5:
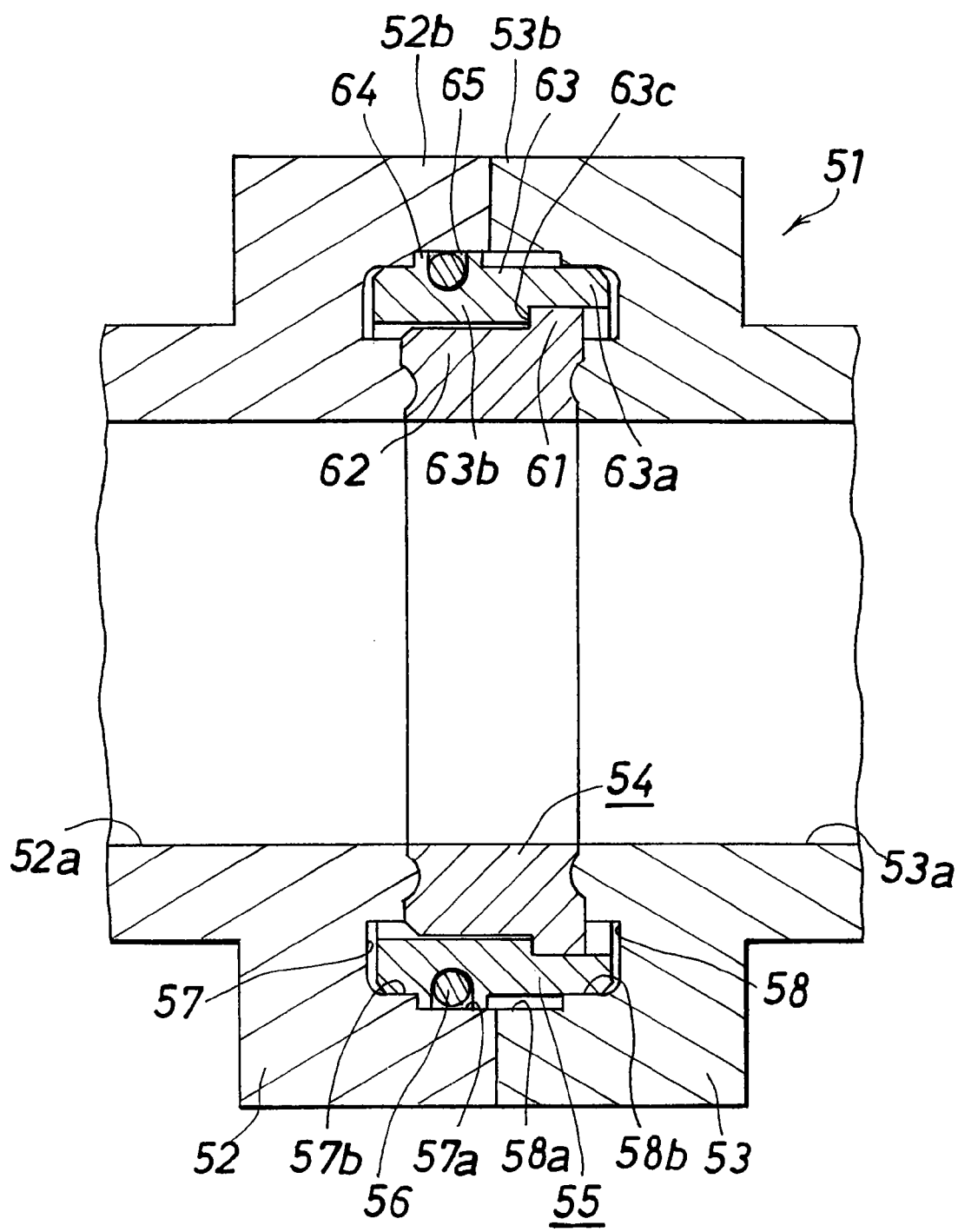
FIG. 5 is a vertical cross-sectional view illustrating a third embodiment of a pipe joint according to the invention.

FIG. 5 illustrates a third embodiment of a pipe joint according to the invention. A pipe joint (51) of the third embodiment includes first and second joint members (52), (53) having fluid channels (52a), (53a) communicating with each other, an annular gasket (54), an annular retainer (55) holding the gasket (54), and a resilient ring (56) fitted to an outer periphery of the retainer (55).

The respective joint members (52), (53) are provided with annular retainer storage depressions (57), (58) on abutting end surfaces thereof. Inner peripheral surfaces in the respective retainer storage depressions (57), (58) include large-diameter inner periphery portions (57a), (58a) on the sides of the abutting end surfaces and small-diameter inner periphery portions (57b), (58b) located axially opposite sides thereof. The retainer (55) is fitted to a portion where the retainer storage depressions (57), (58) of the respective joint members (52), (53) are fitted.

In the third embodiment, the sealing device is formed by the gasket (54), the retainer (55), the resilient ring (56), and the retainer storage depressions (57), (58).

The gasket (54) demonstrates a sealing property by a plastic deformation thereof, and includes a large diameter portion (61) and a small diameter portion (62) having the same inner diameter and a smaller outer diameter than the large diameter portion (61).

The retainer (55) includes a cylindrical retainer body (63) having an outer diameter substantially equal to the diameters of the small-diameter inner periphery portions (57b), (58b) of the retainer storage depressions (57), (58), an annular projecting portion (64) formed integrally with the retainer body (63) and being slightly smaller than the outer diameter of the large-diameter inner periphery portions (57a), (58a) of the retainer storage depressions (57), (58), and an annular groove (65) opening to an outer peripheral surface of the annular projecting portion (64).

The gasket (54) is formed, for example, of nickel alloy or stainless steel, and the retainer (55) is formed, for example, of stainless steel.

The retainer body (63) includes a thin portion (63a) having an inner diameter corresponding to the outer diameter of the large diameter portion (61) of the gasket (54) and a thick portion (63b) having an inner diameter corresponding to the outer diameter of the small diameter portion (62) of the gasket (54).

The large diameter portion (61) of the gasket (54) is fitted to the radially inside of the thin portion (63a) of the retainer body (63), and the small diameter portion (62) of the gasket (54) is fitted to the radially inside of the thick portion (63b) of the retainer body (63) respectively. A boundary portion between an inner peripheral surface of the thin portion (63a) and an inner peripheral surface of the thick portion (63b) of the retainer body (63) is formed into a shoulder portion (63c) configured to block the movement of the gasket (54) in one direction in the axial direction (leftward direction in FIG. 5).

The annular groove (65) of the retainer (55) is formed into a substantially U-shape, and the resilient ring (56) is fitted into the annular groove (65). The resilient ring (56) is referred to as a snap ring, which is a metallic wire member having a circular cross section into a C-shape, and has resiliency in the radial direction. The resilient ring (56) is not limited to the snap ring, and various ring-shaped members having resiliency such as an O-ring may be used.

The resilient ring (56) has an outer diameter slightly larger than the diameter of the annular projecting portion (64) of the retainer (55) in a free state. The depth of the annular groove (65) has a size which can accommodate the resilient ring (56) entirely when being pushed therein radially inward.

The annular groove (65) is not arranged at a center of the retainer body (63), but is formed as is deviated to one side (leftward in the illustrated example) from the center, whereby the resilient ring (56) is sandwiched between one of the joint members (the first joint member in the illustrated example) (52) and the retainer (55).

The pipe joint (51) of the third embodiment is used in an assembled state in which the retainer (55) holds the gasket (54) so as to be mountable and demountable, and the resilient ring (56) is fitted to the retainer (55) so as to be mountable and demountable. The retainer (55) is configured to be capable of holding any of the first and second joint members (52), (53), and assembly may be performed without discriminating the shapes of the abutting end surfaces of the joint members (52), (53).

According to the pipe joint (51) of the third embodiment, entry of fine particles from the outside is prevented and hence entry of fine particles from the outside into the fluid channels (52a), (53a) is prevented by fitting of the retainer body (63) having the same outer diameter as the diameter of the small-diameter inner periphery portions (57b), (58b) of the retainer storage depressions (57), (58) and the small-diameter inner periphery portions (57b), (58b) of the retainer storage depressions (57), (58), and hence high cleanliness is maintained.

FIG. 5 illustrates a state after the adequate tightening, and a high sealing property is obtained by the deformation of the gasket (54). In this state, end surfaces of outer peripheral portions (52b), (53b) of the respective joint members (52), (53) forming respective outer peripheral walls of the retainer storage depressions (57), (58) are in tight contact with each other, so that entry of fine particles from the outside is prevented. In addition, since a tactile feedback changes when continuing tightening of the joint members (52), (53) by tight contact of the end surface of the outer peripheral portions (52b), (53b) of the respective joint members (52), (53) with respect to each other, the outer peripheral portions (52b), (53b) of the respective joint members (52), (53) also have a function of preventing overtightening.

With a combination of the configuration illustrated in FIG. 5, the Co—P alloy metal coating (31), and the nut (6) applied with the fluorine coating (32), higher cleanliness is achieved.

What is claimed is:

1. A pipe joint for preventing a generation of fine particles comprising:
    first and second joint members having fluid channels communicating with each other;
    a sealing device configured to seal an abutting portion between the both joint members; and
    a nut configured to couple the joint members with respect to each other, wherein
    the nut is formed with a Co—P alloy metal coating on an inner surface thereof,
    wherein a fluorine coating is applied on the surface of the Co—P alloy metal coating;
    a thickness of the Co—P alloy metal coating ranges from 0.1 µm to 10 µm;
    a P content for the Co—P alloy is 3% to 10%;
    the fluorine coating is polytetrafluoroethylene; and
    a thickness of the fluorine coating ranges from 10 nm to 1 µm.

2. A pipe joint for preventing a generation of fine particles comprising:
    first and second joint members having fluid channels communicating with each other;
    a sealing device configured to seal an abutting portion between the both joint members; and
    a nut configured to couple the joint members with respect to each other, wherein
    the nut is formed with a Co—P alloy metal coating on an inner surface thereof,
    wherein a fluorine coating is applied on the surface of the Co—P alloy metal coating,
    a thickness of the Co—P alloy metal coating ranges from 0.1 µm to 10 µm,
    a P content for the Co—P alloy is 3% to 10%,
    the fluorine coating is polytetrafluoroethylene,
    a thickness of the fluorine coating ranges from 10 nm to 1 µm,
    the sealing device includes a gasket and a retainer configured to hold the gasket and fitted to retainer storage depressions provided respectively on abutting end surfaces of the both joint members,
    inner peripheral surfaces of the retainer storage depressions of the respective joint members include large-diameter inner periphery portions on the side of the abutting end surfaces and small-diameter inner periphery portions on axially opposite sides thereof,
    the retainer includes a cylindrical retainer body having an outer diameter substantially equal to the diameters of the small-diameter inner periphery portions of the retainer storage depressions, an annular projecting portion formed integrally with the retainer body, and an annular groove opening to an outer peripheral surface of the annular projecting portion, and
    a resilient ring configured to cause the joint member to hold the retainer is fitted to the annular, groove of the retainer,
    wherein in a state after tightening, end surfaces of outer peripheral portions of the respective joint members forming respective outer peripheral walls of the retainer storage depressions are in contact with each other.

* * * * *